United States Patent [19]
Saadi et al.

[11] Patent Number: 5,431,181
[45] Date of Patent: Jul. 11, 1995

[54] AUTOMATIC VALVE ASSEMBLY

[75] Inventors: Robert E. Saadi; Brian N. Creager, both of Erie; Harinder Singh, McKean, all of Pa.

[73] Assignee: Zurn Industries, Inc., Erie, Pa.

[21] Appl. No.: 131,010

[22] Filed: Oct. 1, 1993

[51] Int. Cl.[6] .................... F16K 31/40; F16K 31/126
[52] U.S. Cl. .......................................... 137/15; 4/304; 4/305; 4/DIG. 3; 137/315; 251/30.03; 251/30.05; 251/45; 251/129.04
[58] Field of Search .............. 251/30.03, 30.04, 30.05, 251/40, 42, 45, 46, 129.04; 4/304, 305, 306, 623, DIG. 3; 137/15, 315

[56] References Cited

U.S. PATENT DOCUMENTS

| | | | |
|---|---|---|---|
| 300,468 | 6/1884 | Haskell et al. | 251/38 |
| 2,130,611 | 9/1938 | Burdick | 251/38 |
| 2,235,304 | 3/1941 | Toussaint | 251/45 |
| 3,008,682 | 11/1961 | Filliung et al. | 251/19 |
| 3,008,683 | 11/1961 | Filliung et al. | 251/30 |
| 3,011,751 | 12/1961 | Delany et al. | 251/30 |
| 3,202,396 | 8/1965 | Delany et al. | 251/30 |
| 4,235,414 | 11/1980 | Lis | 251/46 |
| 4,505,450 | 3/1985 | Saarem et al. | 251/46 |
| 4,508,136 | 4/1985 | Kah, Jr. | 251/46 |
| 4,671,485 | 6/1987 | Saarem | 251/30.03 |
| 4,742,583 | 5/1988 | Yoshida et al. | 4/313 |
| 4,793,588 | 12/1988 | Laverty, Jr. | 251/30.03 |
| 4,805,247 | 2/1989 | Laverty, Jr. | 4/304 |
| 4,839,039 | 6/1989 | Parsons et al. | 210/143 |
| 4,886,207 | 12/1989 | Lee et al. | 236/12.12 |
| 4,891,864 | 1/1990 | Laverty, Jr. | 91/399 |
| 4,911,401 | 3/1990 | Holcomb et al. | 251/30.05 |
| 4,971,287 | 11/1990 | Shaw | 251/30.05 |
| 4,972,070 | 11/1990 | Laverty, Jr. | 250/221 |
| 4,989,277 | 2/1991 | Tsutsui et al. | 4/367 |
| 5,025,516 | 6/1991 | Wilson | 4/623 |
| 5,062,453 | 11/1991 | Saadi et al. | 137/624.11 |
| 5,063,955 | 11/1991 | Sakakibara | 137/1 |
| 5,125,621 | 6/1992 | Parsons et al. | 251/30.03 |
| 5,155,870 | 10/1992 | Tsutsui et al. | 4/300 |
| 5,169,118 | 12/1992 | Whiteside | 251/30.03 |
| 5,187,818 | 2/1993 | Barrett, Sr. et al. | 4/313 |
| 5,195,720 | 3/1993 | Nortier et al. | 251/129.04 |
| 5,244,179 | 9/1993 | Wilson | 251/30.03 |

FOREIGN PATENT DOCUMENTS 55-24389 2/1980 Japan.

*Primary Examiner*—George L. Walton
*Attorney, Agent, or Firm*—Webb Ziesenheim Bruening Logsdon Orkin & Hanson

[57] ABSTRACT

A valve assembly is disclosed which is adapted to fit existing valve bodies. A flexible diaphragm assembly positioned within the valve body seals against a cylindrical barrel of the valve body. A central tube positioned within the central barrel defines a bypass passage extending from an upper chamber above the flexible diaphragm assembly and communicating with a bypass orifice. A sealing mechanism operated by an automatic control mechanism is adapted to selectively seal the bypass orifice. The automatic control mechanism includes a proximity sensor.

20 Claims, 7 Drawing Sheets

AUTOMATIC VALVE ASSEMBLY

BACKGROUND OF THE INVENTION

1. Field of the Invention

The present invention is concerned with a flush valve which is rendered operative in response to activation by a proximity sensor.

2. Prior Art

Various automatic valve assemblies known in the prior art such as, for example, shown in U.S. Pat. Nos. 4,793,588; 4,971,287; 4,989,277; 5,125,621 and 5,169,118.

These prior art designs suffer from several deficiencies. Several of the designs require unique valve body arrangements and are therefore not applicable to conventional valve bodies. A nonconventional valve body design is impractical for wide use and eliminates the opportunity to retrofit existing systems.

Other automatic valve assemblies of the prior art incorporate the sensor and associated closing members above the diaphragm in a position above the top cover wherein the assembly is subjected to the relatively high pressure (up to 100 psi) which exists in the head area. Several of these designs require an additional top cover to be incorporated into the valve body to enclose the added structure.

The object of the present invention is to overcome drawbacks of the prior art designs. An additional object of the present invention is to provide an automatic valve assembly which is adapted to be incorporated in a conventional valve body. A further object of the present invention is to provide a compact, efficient and effective automatic valve assembly.

SUMMARY OF THE INVENTION

The objects of the present invention are achieved by providing a valve assembly which includes a valve body having an inlet, an outlet and a cylindrical barrel positioned between the inlet and the outlet. This valve body represents a conventional valve body design. Therefore, the valve assembly of the present invention may be incorporated into existing valve bodies. A flexible diaphragm assembly is adapted to seal against an upper edge of the cylindrical barrel and defines an upper chamber above the flexible diaphragm assembly. A trip or pilot valve mechanism is provided which includes a bypass assembly and a sealing mechanism. The bypass assembly includes a central tube positioned within the cylindrical barrel and defines a bypass passage extending from the upper chamber to a bypass orifice. The sealing mechanism is adapted to selectively seal the bypass orifice. An automatic control mechanism is coupled to the sealing mechanism and adapted to activate the sealing mechanism to selectively seal the bypass orifice. The automatic control mechanism includes a proximity sensor.

In one embodiment of the present invention, the sealing mechanism is positioned below the cylindrical barrel and includes a latching solenoid adapted to move a piston. A nipple is attached on the end of the piston wherein the nipple is adapted to engage and seal the bypass orifice. The piston is preferably orientated substantially perpendicular to the cylindrical barrel and the central tube.

It is preferred that the automatic control mechanism including the proximity sensor be positioned adjacent the valve body below the cylindrical barrel at the manual handle extension opening of the valve body. The proximity sensor is adapted to be positioned on the valve body where a handle of a manual flush valve is located.

In one embodiment of the present invention, a filter is positioned on top of the central tube. An upper end of the filter is received within a centering disc positioned within an inner cover of the valve body. The centering disc positions the filter and the central tube along the longitudinal axis of the cylindrical barrel.

The flexible diaphragm assembly includes a flexible diaphragm with a radially outer mounting portion and a radially inner seating surface adapted to seal against the upper edge of the cylindrical barrel. The flexible diaphragm includes a conventional bypass. The flexible diaphragm assembly further includes a flow ring adjacent the flexible diaphragm and a barrel slide member adjacent both the flexible diaphragm and the flow ring. The flexible diaphragm assembly includes a locking element threadably connected to the barrel slide, wherein the locking element is adapted to slide along the central tube. A seal is provided between the central tube and the flexible diaphragm assembly.

These and other objects of the present invention will be clarified in the description of the preferred embodiments in connection with the attached drawings, wherein like reference numerals represent like elements throughout.

DESCRIPTION OF THE PREFERRED EMBODIMENTS

Figure 1:
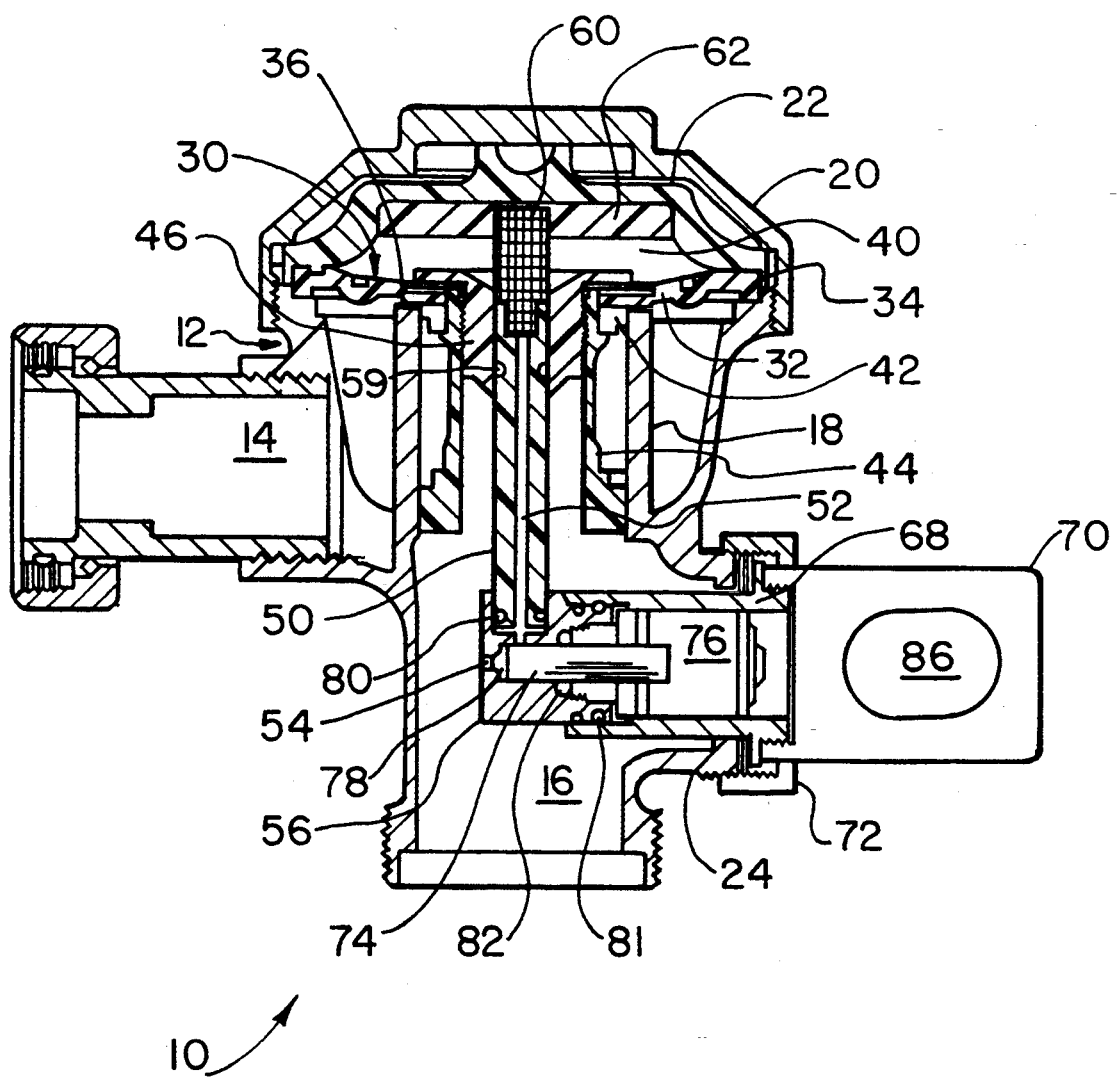
FIG. 1 is a section view of the automatic valve assembly according to one embodiment of the present invention.
Figure 2:
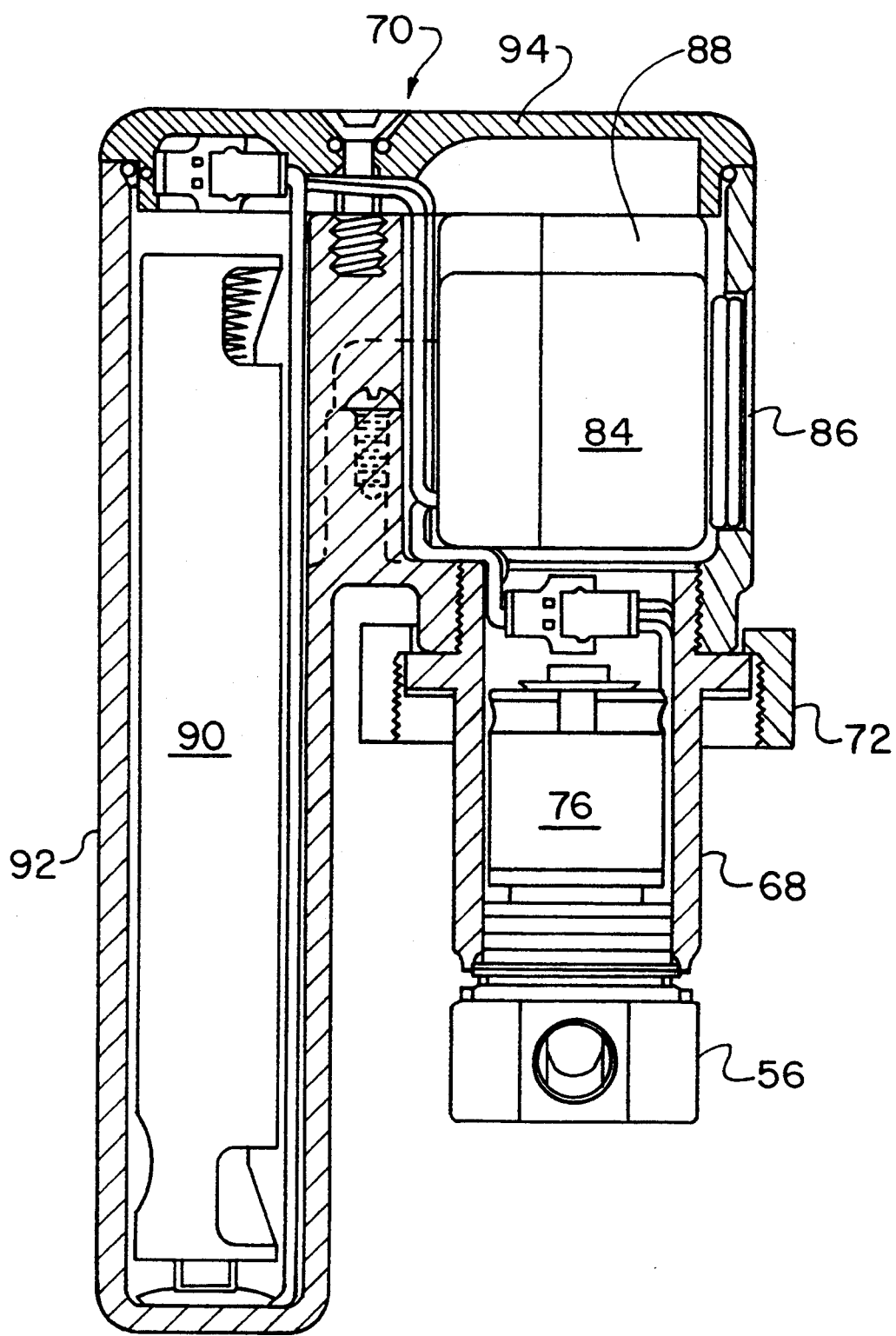
FIG. 2 is a top view of the automatic control mechanism of the automatic valve assembly shown in FIG. 1 with the valve body omitted.

FIGS. 1-2 illustrates a valve assembly 10 according to the present invention. The valve assembly 10 includes a valve body 12 having an inlet opening 14, an outlet opening 16 and a substantially vertical, cylindrical barrel 18 positioned between the inlet opening 14 and the outlet opening 16. The valve body 12 includes a top cover 20 threadably connected to a lower portion of the valve body 12. An inner cover 22 is positioned within the top cover 20 of the valve body 12. The valve body 12 represents a conventional valve body design, thereby allowing the valve assembly 10 of the present invention to be incorporated into existing valves.

The valve body 12 includes a manual handle extension opening 24 with a threaded exterior. The manual handle extension opening 24 would be adapted to receive a handle for activating a trip valve in a conventional manual flush valve.

A flexible diaphragm assembly 30 is secured to the valve body 12 and includes a flexible diaphragm 32 with a radially outer mounting portion 34 and a radially inner seating surface 36. The flexible diaphragm 32 includes a conventional bypass (not shown). The seating surface 36 of the flexible diaphragm 32 is adapted to seal against an upper edge of the cylindrical barrel 18 and defines an upper chamber 40 above the flexible diaphragm 32. The mounting portion 34 of the flexible diaphragm 32 is clamped into position by the threading of the top cover 20 onto the lower portion of the valve body 12. The flexible diaphragm assembly 30 includes a flow ring 42 adjacent the seating surface 36 of the flexible diaphragm 32 and a barrel slide 44 adjacent the flexible diaphragm 32 and adjacent the flow ring 42. A locking element 46 is threadably connected to the barrel slide 44 and operates to secure the flexible diaphragm assembly 30 together.

A bypass assembly includes a brass central tube 50 positioned within the cylindrical barrel 18 and defining a bypass passage 52 extending from the upper chamber 40 to a bypass orifice 54 or outlet within a piston housing 56. The bypass orifice 54 is in fluid communication with the bypass passage 52 through opening 58 and with the outlet opening 16. The locking element 46 is adapted to slide along the central tube 50 with a fluid sealing member 59, such as an O-ring, provided between the central tube 50 and the locking element 46.

A filter 60 is provided on the top end of the central tube 50 to prevent material from clogging the bypass passage 52 or the bypass orifice 54. An upper end of the filter 60 is received within a centering disc 62 positioned in the inner cover 22 of the valve body 12. The centering disc 62 positions the filter 60 and the central tube 50 along the longitudinal axis of the cylindrical barrel 18.

The lower end of the central tube 50 is received within the piston housing 56 which is coupled to a solenoid housing 68. The solenoid housing 68 is adjacent an automatic control mechanism 70. The automatic control mechanism 70, the solenoid housing 68 and the piston housing 56 are attached to the manual handle extension opening 24 by a threaded handle nut 72 and extend into the interior of the valve body 12. The threaded handle nut 72 is designed specifically to fit the automatic control mechanism 70.

The bypass orifice 54 is positioned within the piston housing 56. A piston 74 is mounted for movement by a magnetic latching solenoid 76 provided within the solenoid housing 68 wherein the piston 74 is adapted for movement substantially perpendicular to the cylindrical barrel 18 and the central tube 50. A sealing nipple 78 is attached to an end of the piston 74 and is adapted to engage and seal against the bypass orifice 54 when the piston is in a first position, as shown in FIG. 1. Appropriate seals 80, 81 and 82, such as O-rings, are provided between the central tube 50 and the piston housing 56, between the piston housing 56 and the solenoid housing 68, and between the piston housing 56 and the piston 74.

The automatic control mechanism 70, shown in FIG. 2, includes a proximity sensor 84 positioned adjacent the valve body 12, integral with the valve assembly 10, which is adapted to control the actuation of the solenoid 76. The proximity sensor 84 is positioned behind a tempered glass lens 86 which resists chemical attack and scratching. The proximity sensor 84 and the associated electronic circuitry 88 are of conventional type. For example, the proximity sensor 84 may be an infrared or a combination infrared and light sensor. An appropriate sensor and associated circuitry is the AQUAFLUSH ® sensor sold by Zurn Industries, Inc. Similar sensors and associated circuitry may be found in prior U.S. Pat. Nos. 4,793,588; 4,971,287 and 5,169,118. The automatic control mechanism 70 and solenoid 76 can be powered by a battery source incorporated into the automatic control mechanism 70 such as, for example, four AA batteries positioned within a battery case 90. The battery case 90 is separate from the housing 92 for the automatic control mechanism 70 to contain any leakage of the batteries. The housing 92 includes a removable cap 94 providing access to the interior of the housing 92. The battery case 90 is of a compact design which is positioned behind the automatic control mechanism and the valve body 12. Lithium batteries may also be utilized to provide a compact arrangement with long battery life. The battery source would preferably have a life of approximately three years.

The valve assembly 10 described above operates as follows. In the initial operating position, the piston 74 is in the position shown in FIG. 1 with the sealing nipple 78 engaging and sealing the bypass orifice 54 preventing water from escaping from the upper chamber 40 through the bypass passage 52. Water in the upper chamber 40 will maintain the flexible diaphragm 32 sealed against the cylindrical barrel 18.

When the proximity sensor 84 determines the presence of a user, the automatic control mechanism 70 operates as follows. When the user leaves and the proximity sensor 84 ceases to detect the presence of the user, the solenoid 76 is actuated to move the piston 74 to a second position (not shown) away from the bypass orifice 54 wherein the sealing nipple 78 is spaced from the bypass orifice 54, thereby allowing water to flow from the upper chamber 40 through the bypass passage 52, opening 58, and out of the bypass orifice 54 to the outlet opening 16. The emptying of water from the upper chamber 40 decreases pressure in the upper chamber 40 wherein the flexible diaphragm 32 moves upward by the pressure of the water in the inlet opening 14, thereby opening the valve assembly 10 and allowing the water to flow directly from the inlet opening 14 to the outlet opening 16 through the cylindrical barrel 18. After a predetermined, set period of time, the solenoid 76 is again actuated by the automatic control mechanism 70 to move the piston 74 back to the initial position, shown in FIG. 1, wherein the sealing nipple 78 engages the bypass orifice 54 to seal the bypass orifice 54, preventing flow of water from the upper chamber 40 through the bypass passage 52. Water will flow into the upper chamber 40 through the flexible diaphragm bypass and seal the seating surface 36 against the upper edge of the cylindrical barrel 18, thereby closing off the valve when there is sufficient pressure in the upper chamber 40. The flushing cycle is then complete and can be repeated.

The design of the present invention allows for easy retrofit of existing manual flush valve assemblies. The procedure is as follows. The handle assembly and relief valve assembly are removed. The existing flexible diaphragm assembly can either be replaced or modified to conform with the flexible diaphragm assembly 30 of the present invention. The automatic control mechanism 70 and the sealing mechanism (including the piston housing 56, solenoid housing 68, the piston 74, the battery source, the latching solenoid 76 and associated structure) are positioned to extend into the interior of the valve body 12 and attached by threaded handle nut 72 at a position where the handle assembly was removed from the valve body 12. The central tube 50, filter 60 and centering disc 62 are then positioned with the appropriate seals in position. The retrofitting of the valve assembly is now complete.

Figure 3:
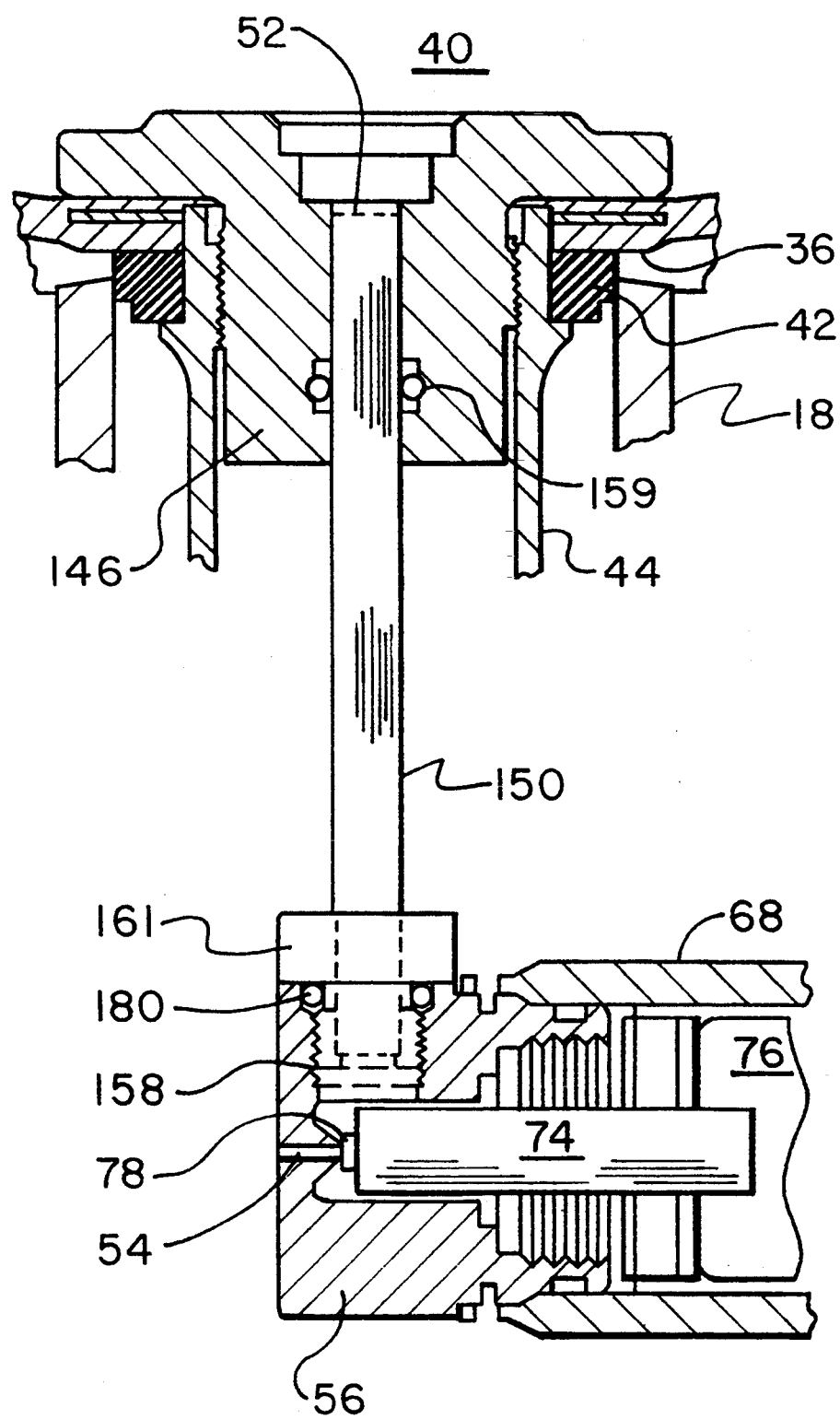
FIG. 3 is a section view of a bypass assembly for an automatic valve assembly according to a second embodiment of the present invention.

A modified bypass assembly according to a second embodiment of the present invention is illustrated in FIG. 3. The modified bypass assembly includes a central tube 150 positioned within the cylindrical barrel 18 and defining the bypass passage 52 extending from the upper chamber 40 to the bypass orifice 54. The bypass orifice 54 is in fluid communication with the bypass passage 52 through a threaded opening 158. A threaded tube coupling 161 is threaded into threaded opening 158 and is configured to receive the lower end of the nylon central tube 150. An appropriate seal 180 is provided between the threaded tube coupling 161. A locking element 146 shows an alternative form for the locking element of the flexible diaphragm assembly and operates in the same fashion as locking element 46 described above. The locking element 146 is adapted to slide along the nylon central tube 150 with a fluid sealing member 159, such as an O-ring, provided between the nylon central tube 150 and the locking element 146. The fluid sealing member 159 is a female O-ring, as shown in FIG. 3. Alternatively, a male O-ring positioned within a groove on the nylon central tube 150 may be utilized, such as shown with fluid sealing member 59 in FIG. 1. The nylon central tube 150 provides for a flexible connection which resists binding. Additionally, the nylon central tube 150 provides excellent sealing.

Figure 4:
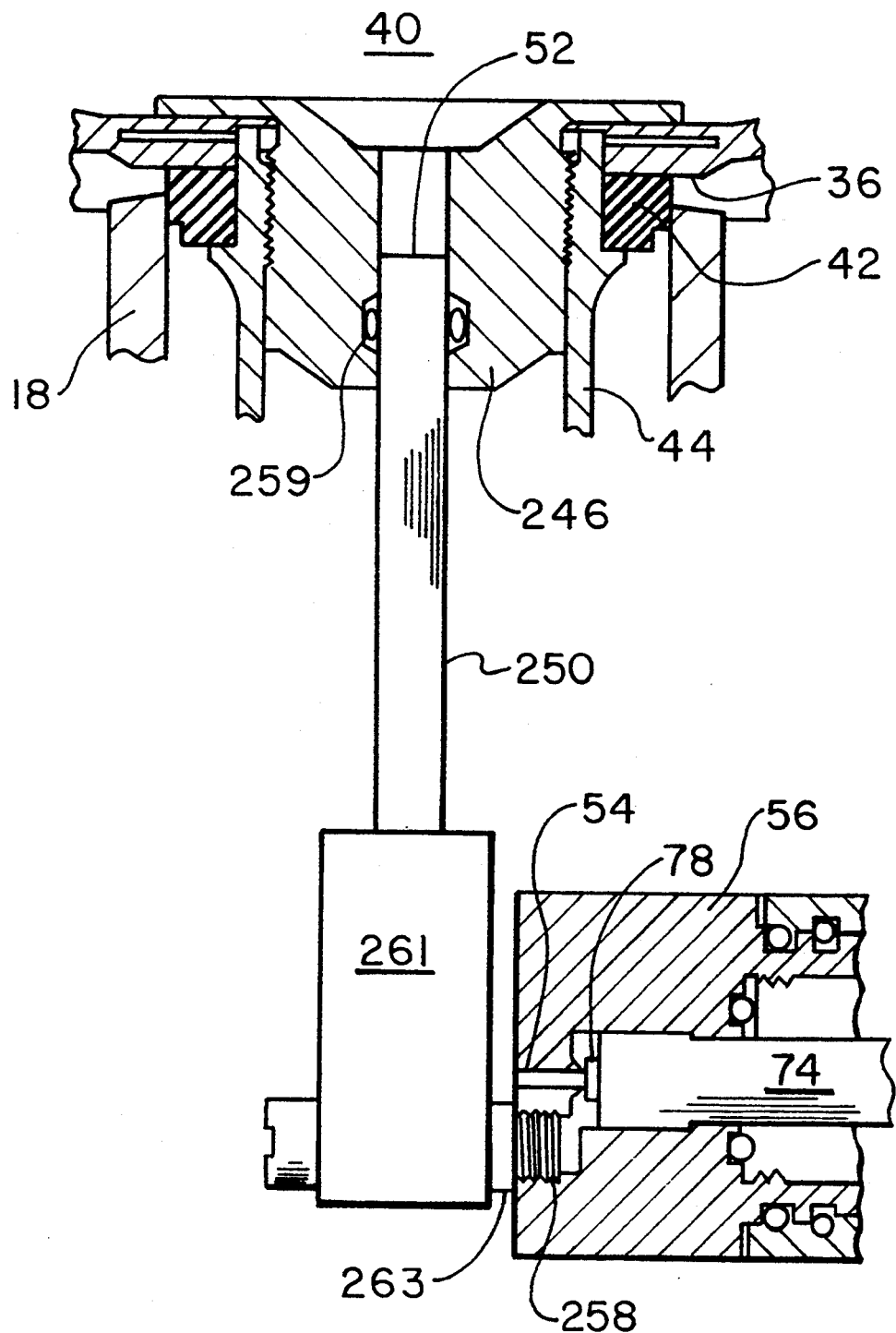
FIG. 4 is a section view of a bypass assembly for an automatic valve assembly according to a third embodiment of the present invention.

FIG. 4 illustrates a modified bypass assembly according to a third embodiment of the present invention. The modified bypass assembly includes a central tube 250 positioned within the cylindrical barrel 18 and defining the bypass passage 52 extending from the upper chamber 40 to the bypass orifice 54. A locking element 246 operates in the same manner as locking element 46 described above. The locking element 246 is adapted to slide along the central tube 250 with a fluid sealing member 259 positioned therebetween. The bypass passage 52 extends from the upper chamber 40 to a bypass orifice 54 within the piston housing 56. The bypass orifice 54 is in fluid communication with the bypass passage 52 through threaded opening 258 provided in the piston housing 56 at a location below the bypass orifice 54. The lower end of the central tube 250 is received within a tube coupler 261 having an attached threaded connection 263 threadably engaging the threaded opening 258. The tube coupler 261 and attached threaded connection 263 are of a conventional type making the bypass assembly easily manufactured.

Figure 5:
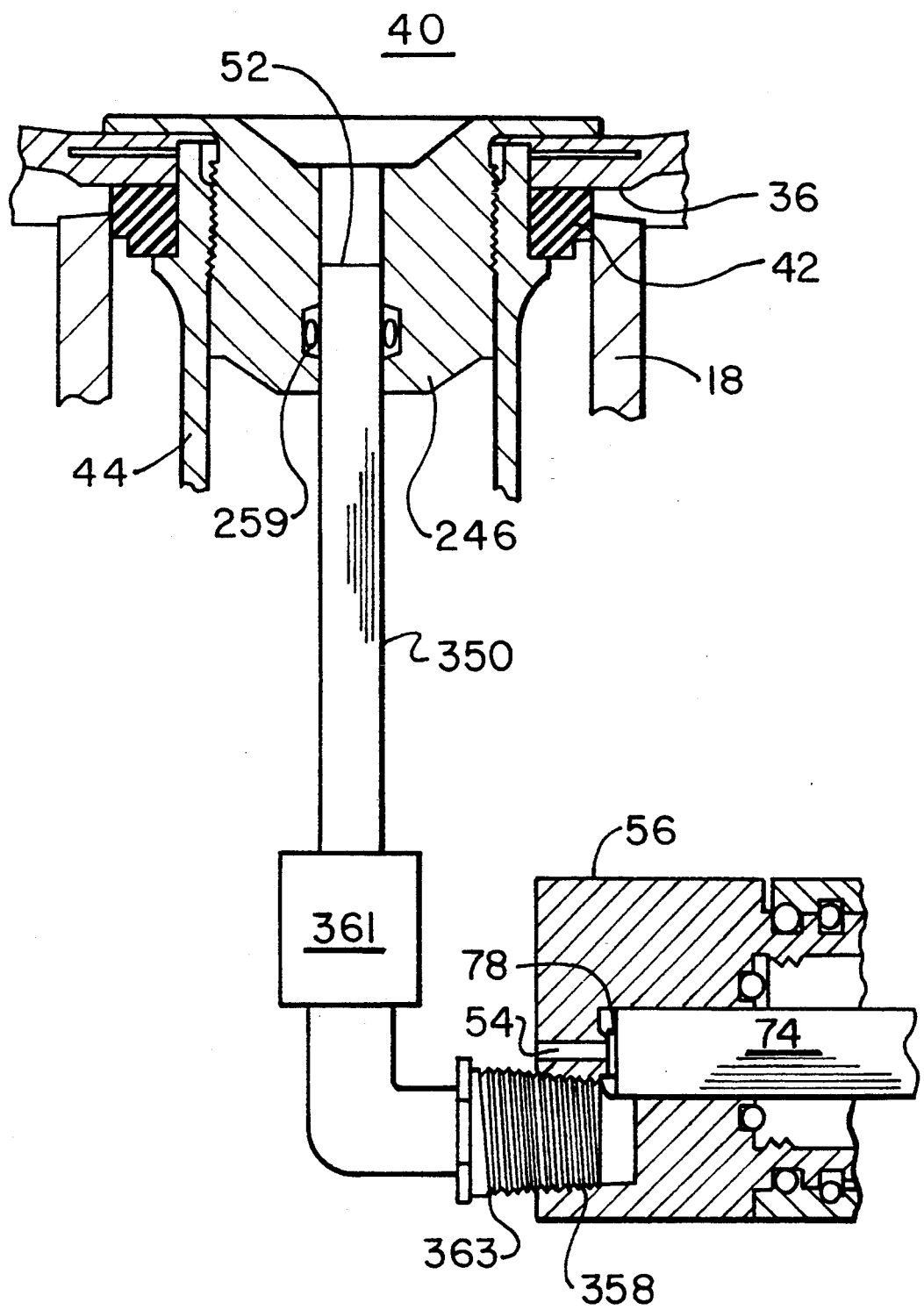
FIG. 5 is a section view of a bypass assembly for an automatic valve assembly according to a fourth embodiment of the present invention.

FIG. 5 illustrates a modified bypass assembly according to a fourth embodiment of the present invention. The modified bypass assembly includes a central tube 350 positioned within the cylindrical barrel 18 and defining a bypass passage 52 extending from the upper chamber 40 above the locking element 346 to a bypass orifice 54 within the piston housing 56. The bypass orifice 54 is in fluid communication with the bypass passage 52 through threaded opening 358 which is positioned below the bypass orifice 54 in the piston housing 56. An elbow connector 361 having a threaded end 363 and threadably engaging the opening 358 receives the lower end of the central tube 350. The elbow connector 361 of this modified bypass assembly is of a conventional design and allows for easy manufacturing and assembly of the present invention.

Figure 6:
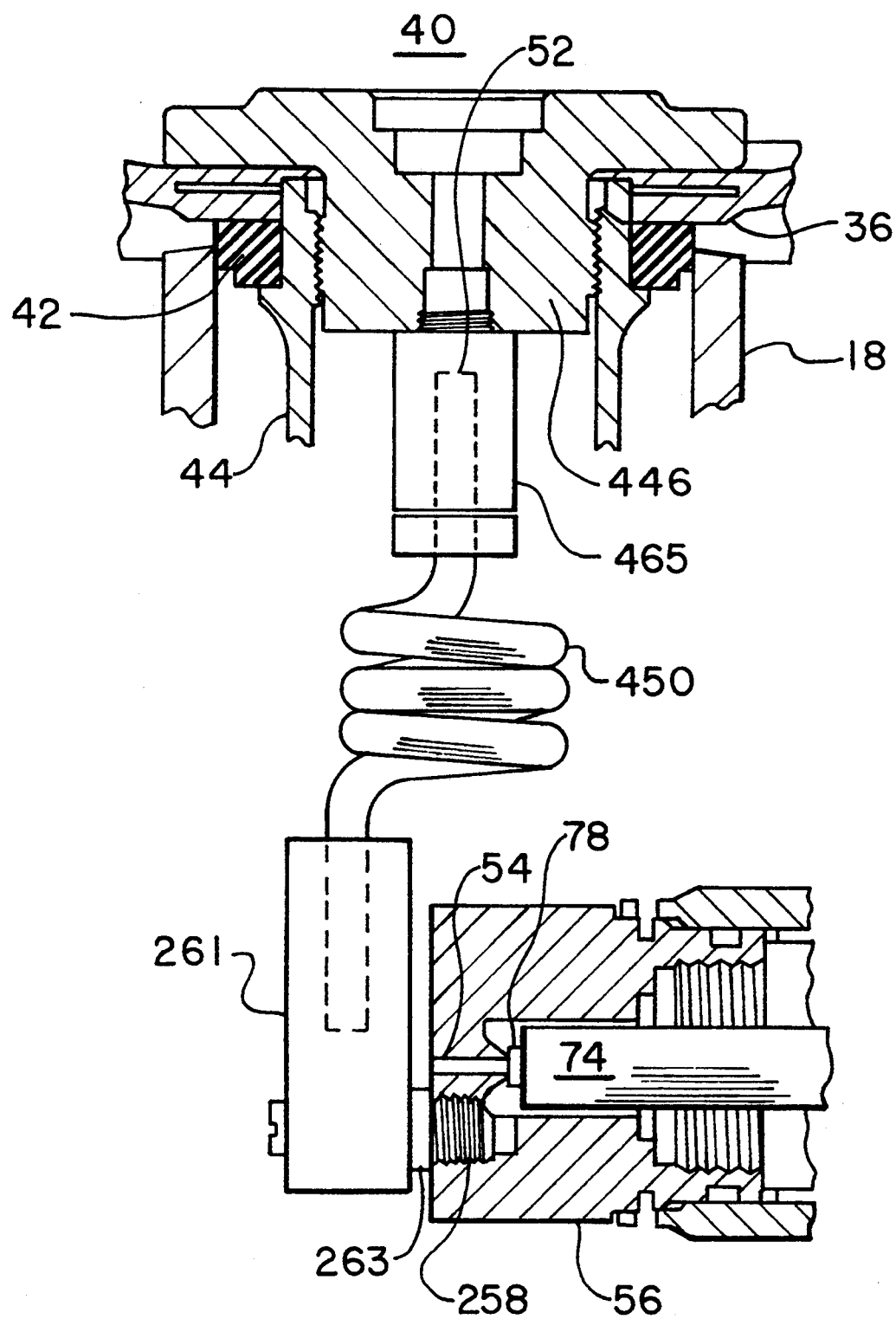
FIG. 6 is a section view of a bypass assembly for an automatic valve assembly according to a fifth embodiment of the present invention.

FIG. 6 illustrates a modified bypass assembly according to a fifth embodiment of the present invention. The modified bypass assembly includes a coiled central tube 450 positioned within the cylindrical barrel 18 and defining a bypass passage 52 extending from the upper chamber 40 to a bypass orifice 54 within the piston housing 56. The bypass orifice 54 is in fluid communication with the bypass passage 52 through threaded opening 458. The tube coupler 261 receives a lower end of the coiled central tube 450 and operates in the same fashion as described in the embodiment disclosed above in connection with FIG. 4. A tube coupler 465 receives an upper end of the flexible central tube 450 and is threadably engaged with the locking element 446. In operation, the coils of the flexible central tube 450 allow the diaphragm assembly 30 to move into the seated and unseated positions. This embodiment has the advantages of securely fastening the central tube 450 to the locking element 446 through threaded tube coupler 465 and to the piston housing 56 through tube coupler 261, thereby eliminating the relative movement between a locking element and a central tube and the associated sealing problems associated therewith.

Figure 7:
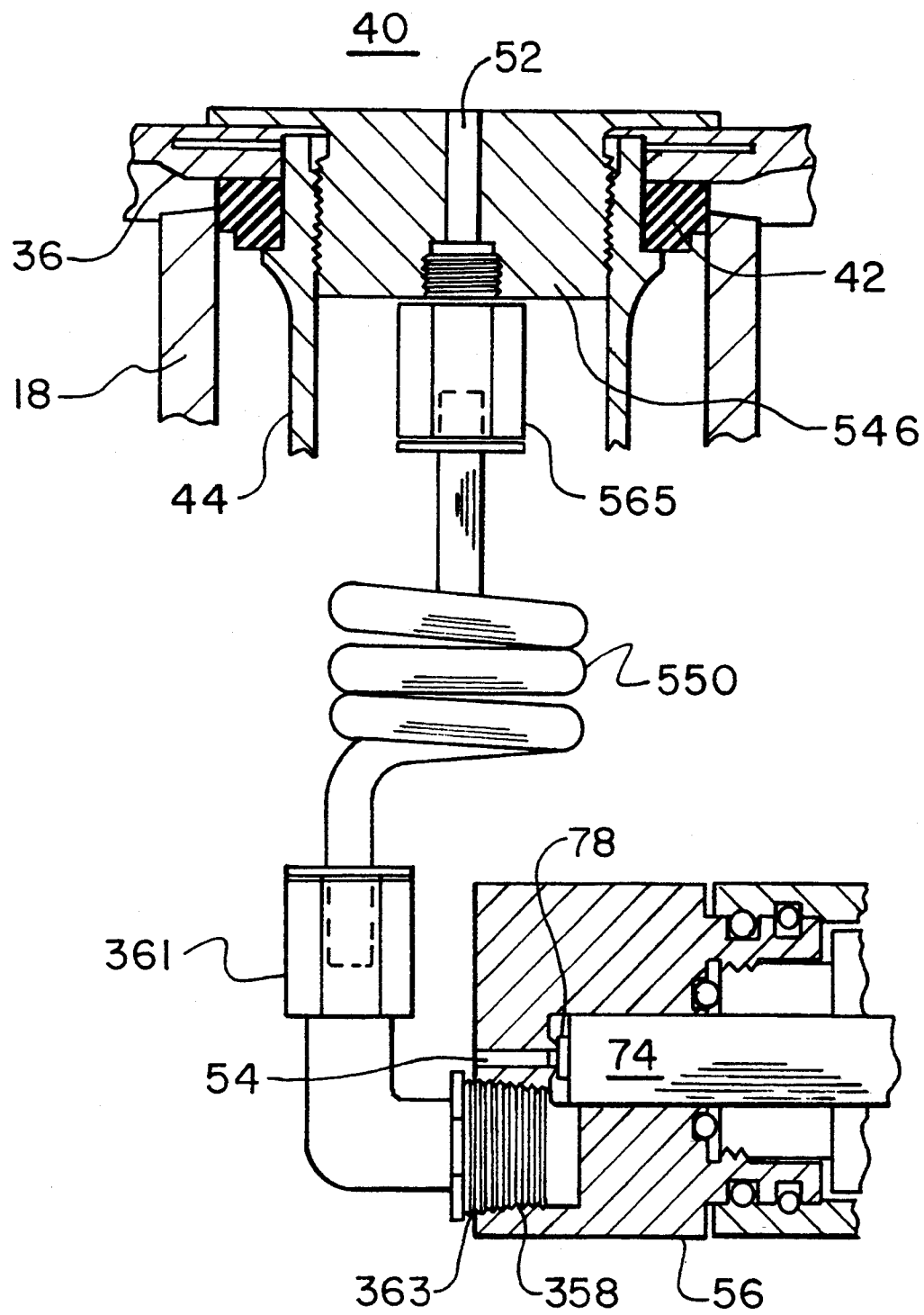
FIG. 7 is a section view of a bypass assembly for an automatic valve assembly according to a sixth embodiment of the present invention.

FIG. 7 illustrates a modified bypass assembly according to a sixth embodiment of the present invention. The modified bypass assembly includes a flexible, coiled central tube 550 positioned within the cylindrical barrel 18 and defining a portion of the bypass passage 52 extending from the upper chamber 40 to a bypass orifice 54 within the piston housing 56. The bypass assembly is similar to the bypass assembly disclosed in FIG. 6 except that tube coupler 261 is replaced with elbow connector 361 which was previously disclosed in connection with the embodiment shown in FIG. 5. The bypass assembly of FIG. 7 further differs from the bypass assembly of FIG. 6 in that a different type of tube coupler 565 receives the upper portion of the flexible, coiled central tube 550. The tube coupler 565 is threadably attached to a locking element 546. In operation, the embodiment disclosed in FIG. 7 is substantially the same as the embodiment disclosed in FIG. 6. In both FIGS. 6 and 7, the bypass passage extends from the upper chamber 40 to the bypass orifice 54 through locking elements 446, 546; the tube couplers 465, 565; the flexible, coiled central tubes 450, 550; the tube coupler 261 or elbow connector 361 and threaded openings 258, 358.

The filter 60 may be positioned on top of the central tubes 50, 150, 250, 350, 450 and 550 of all of the embodiments described above to prevent blocking of the downstream bypass passage 52 or the bypass orifice 54.

All of the embodiments of the present invention attach the entire automatic control mechanism 70 to the valve body 12 at the manual handle extension opening 24 where the handle of a manual flush valve would be. By placing the sensor 84 in the handle region, as opposed to the head of the flush valve, the automatic control mechanism 70 is subjected to a lower pressure range of the valve area, i.e., the outlet pressure. The outlet pressure can be as high as 40 psi but typically is 15 psi, wherein in the head area, the pressure can reach up to 100 psi. By placing the specific arrangement in the handle, the electronics are positioned away from the diaphragm. With this configuration, it is recognizable to the user immediately that a sensor is in the handle and the user need not be disorientated as to the placement of the handle. The lens 86 design is easily recognizable by the users. The present design allows for the adjustments to the electronics to be easily made. There is no need to turn off water or disturb the mechanical components of the flush valve as is the case in some prior art designs. In the present design, the battery replacement can be done very easily.

The present design results in a more convenient and aesthetically pleasing and stronger package than that for the top mounted units. Another advantage and feature of the present design is that the handle nut 72 holding the sensor 84 to the valve body 12 can be loosened and the angle of the sensor 84 can be adjusted for optimum operation. A further advantage with the present design is that retrofit installation requires the removal of the flush handle which can be left on inadvertently on head mounted units. In that case, the user would not recognize that it is an automatic flushing valve and may spend considerable time trying to flush the toilet from an inactive handle.

While distinct embodiments of the present invention have been described herein, it will be readily apparent to those of ordinary skill in the art that various changes and modifications may be made to the present design without departing from the spirit and scope thereof. Consequently, the scope of the present invention is intended to be limited only by the attached claims.

What is claimed is:

1. A valve assembly comprising:
   a valve body including an inlet, an outlet, a cylindrical barrel positioned between said inlet and said outlet, and a manual handle extension opening;
   a flexible diaphragm assembly configured to selectively seal against an upper surface of said cylindrical barrel;
   a pilot valve mechanism for selectively moving said flexible diaphragm between a sealed and unsealed position; and
   an automatic control and sealing means configured to activate said pilot valve mechanism to selectively seal said flexible diaphragm against said upper surface, a portion of said automatic control means extending through said manual handle extension opening, and said automatic control means including a proximity sensor mounted within a housing removably attached to said manual handle extension opening.

2. The valve assembly of claim 1 wherein said trip mechanism includes:
   a bypass assembly defining a bypass passage which extends from said flexible diaphragm assembly to said outlet; and
   a sealing means configured to selectively close said bypass passage.

3. A valve assembly comprising:
   a valve body including an inlet, an outlet and a cylindrical barrel positioned between said inlet and said outlet;
   a flexible diaphragm assembly adapted to seal against an upper surface of said cylindrical barrel and defining a first, upper chamber positioned on one side of said flexible diaphragm assembly and a second, lower chamber defined on a second side of said flexible diaphragm assembly, said second chamber including said outlet;
   a bypass assembly including a central tube positioned within said cylindrical barrel, said central tube of said bypass assembly defining a bypass passage extending from said first chamber to said second chamber, a bypass orifice within said bypass assembly positioned within said second chamber, said bypass orifice in fluid communication with said bypass passage;
   a sealing means positioned below said flexible diaphragm assembly within said second chamber and adapted to selectively seal said bypass orifice; and
   automatic control means coupled to said sealing means adapted to activate said sealing means to selectively seal said bypass orifice Within said second chamber, said automatic control means including a proximity sensor externally of said valve body.

4. The valve assembly of claim 3 wherein said sealing means is positioned below said cylindrical barrel.

5. The valve assembly of claim 3 wherein said sealing means includes a latching solenoid and a piston, wherein said solenoid is adapted to move said piston.

6. The valve assembly of claim 5 wherein said sealing means includes a sealing nipple attached to an end of said piston, wherein said nipple is adapted to engage and seal said bypass orifice when said piston is in a first position.

7. The valve assembly of claim 5 wherein said piston is positioned substantially perpendicular to said cylindrical barrel and said central tube.

8. The valve assembly of claim 3 wherein said proximity sensor is positioned adjacent said valve body below said cylindrical barrel.

9. The valve assembly of claim 3 further including a filter positioned on top of said central tube.

10. The valve assembly of claim 9 wherein an upper end of said filter is received in a centering disc positioned in an inner cover of said valve body.

11. The valve assembly of claim 3 wherein said flexible diaphragm assembly includes a flexible diaphragm with a radially outer mounting portion and an inner seating surface, a flow ring adjacent said flexible diaphragm, a barrel slide member adjacent said flexible diaphragm and said flow ring, and a locking element threadably connected to said barrel slide.

12. The valve assembly of claim 11 wherein said locking element is adapted to slide along said central tube.

13. The valve assembly of claim 11 wherein said central tube is threadably attached to said locking element.

14. A valve assembly comprising:
   a valve body having an inlet opening, an outlet opening and a substantially vertical, cylindrical barrel positioned between said inlet opening and said outlet opening;
   a flexible diaphragm assembly adapted to seal against an upper surface of said cylindrical barrel and defining an upper chamber above said flexible diaphragm assembly and a lower chamber below said flexible diaphragm assembly;
   a central tube means positioned substantially along the longitudinal axis of said cylindrical barrel, said central tube means including
   a bypass orifice positioned within said lower chamber, a central tube defining a bypass passage extending from said upper chamber to said lower chamber and communicating with said bypass orifice, and a filter means for filtering material entering said bypass passage; and a sealing means positioned within said lower chamber and adapted to selectively seal said bypass orifice within said lower chamber, wherein said bypass orifice is positioned below said cylindrical barrel within said lower chamber.

15. The valve assembly of claim 14 wherein said flexible diaphragm assembly includes a flexible diaphragm with a radially outer mounting portion and a radially inner seating surface, a flow ring adjacent said flexible diaphragm, a barrel slide member adjacent said flexible diaphragm and said flow ring, and a locking element threadably connected to said barrel slide.

16. The valve assembly of claim 15 further including an automatic control means coupled to said sealing means adapted to activate said sealing means to selectively seal said bypass orifice, said automatic control means including a proximity sensor positioned within a housing attached to a manual handle extension opening of said valve body.

17. The valve assembly of claim 16 wherein said sealing means includes a horizontally movable piston and a latching solenoid moving said horizontally movable piston, and a sealing nipple attached to one end of said piston, wherein said nipple is adapted to engage and seal said bypass orifice.

18. The valve assembly of claim 17 wherein said solenoid and said piston are provided in a solenoid housing and a piston housing, respectively.

19. The valve assembly of claim 18 wherein said piston housing includes seals provided between said piston housing and said central tube and between said piston housing and said piston.

20. A method of automating an existing valve assembly of the type having a valve body with an inlet opening, an outlet opening and a cylindrical barrel positioned between said inlet opening and said outlet opening, comprising the steps of:

a) removing a manual handle assembly and a relief valve assembly from said existing valve assembly;

b) providing a housing with a bypass orifice and a sealing means adapted to selectively seal said bypass orifice, and an automatic control means coupled to said sealing means adapted to activate said sealing means to selectively seal said bypass orifice, wherein said sealing means and said automatic control means are attached to said valve body at a position where said manual handle assembly was removed; and c) providing a central tube within said cylindrical barrel defining a bypass passage extending from an upper chamber and communicating with said bypass orifice.

* * * * *

UNITED STATES PATENT AND TRADEMARK OFFICE
CERTIFICATE OF CORRECTION

PATENT NO.         : 5,431,181 C1
APPLICATION NO. : 90/006929
DATED              : March 20, 2007
INVENTOR(S)        : Robert E. Saadi et al.

It is certified that error appears in the above-identified patent and that said Letters Patent is hereby corrected as shown below:

Column 2, Line 46, Claim 25, "*as claimed in claim 24,*" should read
-- *as claimed in claim 23,* --

Signed and Sealed this

Twenty-eighth Day of August, 2007

JON W. DUDAS
*Director of the United States Patent and Trademark Office*

(12) EX PARTE REEXAMINATION CERTIFICATE (5710th)
United States Patent
Saadi et al.

(10) Number: US 5,431,181 C1
(45) Certificate Issued: Mar. 20, 2007

(54) AUTOMATIC VALVE ASSEMBLY

(75) Inventors: Robert E. Saadi, Erie, PA (US); Brian N. Creager, Erie, PA (US); Harinder Singh, McKean, PA (US)

(73) Assignee: Zurn Industries, Inc., Erie, PA (US)

Reexamination Request:
No. 90/006,929, Feb. 5, 2004

Reexamination Certificate for:
Patent No.: 5,431,181
Issued: Jul. 11, 1995
Appl. No.: 08/131,010
Filed: Oct. 1, 1993

(51) Int. Cl.
*F16K 31/40* (2006.01)
*F16K 31/126* (2006.01)

(52) U.S. Cl. ............... 137/15.11; 137/15.18; 137/315.04; 137/315.07; 251/30.03; 251/30.05; 251/45; 251/129.04; 4/304; 4/305; 4/DIG. 3

(58) Field of Classification Search ............. 137/15.11, 137/15.18, 315.04, 315.07; 251/30.03, 30.04, 251/30.05, 40, 42, 45, 46, 129.04; 4/304, 4/305, 306, 623, DIG. 3
See application file for complete search history.

(56) References Cited

U.S. PATENT DOCUMENTS

| | | | | |
|---|---|---|---|---|
| 300,468 A | * | 6/1884 | Haskell et al. | 251/38 |
| 2,130,611 A | * | 9/1938 | Burdick | 251/38 |
| 2,235,304 A | * | 3/1941 | Toussaint | 251/45 |
| 2,388,990 A | | 11/1945 | Nelson et al. | |
| 2,507,966 A | | 5/1950 | Filliung, Jr. | |
| 2,552,625 A | | 5/1951 | Filliung, Jr. | |
| 3,008,682 A | * | 11/1961 | Filliung et al. | 251/19 |
| 3,008,683 A | * | 11/1961 | Filliung et al. | 251/30.03 |
| 3,011,751 A | * | 12/1961 | Delany et al. | 251/30.03 |
| 3,034,151 A | | 5/1962 | Filliung | |
| 3,202,396 A | * | 8/1965 | Delany et al. | 251/30.04 |
| 3,462,769 A | | 8/1969 | Ichimori | |
| 4,235,414 A | * | 11/1980 | Lis | 251/46 |
| 4,309,781 A | | 1/1982 | Lissau | |
| 4,505,450 A | * | 3/1985 | Saarem et al. | 251/46 |
| 4,508,136 A | * | 4/1985 | Kah, Jr. | 251/46 |
| 4,671,485 A | * | 6/1987 | Saarem | 251/30.03 |
| 4,742,583 A | * | 5/1988 | Yoshida et al. | 4/313 |
| 4,793,588 A | * | 12/1988 | Laverty, Jr. | 251/30.03 |
| 4,805,247 A | * | 2/1989 | Laverty, Jr. | 4/304 |
| 4,839,039 A | * | 6/1989 | Parsons et al. | 210/143 |
| 4,886,207 A | * | 12/1989 | Lee et al. | 236/12.12 |
| 4,891,864 A | * | 1/1990 | Laverty, Jr. | 91/399 |
| 4,911,401 A | * | 3/1990 | Holcomb et al. | 137/315.05 |
| 4,971,287 A | * | 11/1990 | Shaw | 251/30.05 |
| 4,972,070 A | * | 11/1990 | Laverty, Jr. | 250/221 |
| 4,989,277 A | * | 2/1991 | Tsutsui et al. | 4/367 |
| 5,025,516 A | * | 6/1991 | Wilson | 4/623 |
| 5,062,453 A | * | 11/1991 | Saadi et al. | 137/624.11 |
| 5,063,955 A | * | 11/1991 | Sakakibara | 137/1 |
| 5,125,621 A | * | 6/1992 | Parsons et al. | 251/30.03 |
| 5,155,870 A | * | 10/1992 | Tsutsui et al. | 4/300 |
| 5,169,118 A | * | 12/1992 | Whiteside | 251/30.03 |
| 5,187,818 A | * | 2/1993 | Barrett et al. | 4/313 |
| 5,195,720 A | * | 3/1993 | Nortier et al. | 251/129.04 |
| 5,244,179 A | * | 9/1993 | Wilson | 251/30.03 |

FOREIGN PATENT DOCUMENTS

| | | | |
|---|---|---|---|
| JP | SHO 55-21385 | | 2/1980 |
| JP | 55-24389 | * | 2/1980 |
| JP | H5-14272 | | 2/1993 |

* cited by examiner

*Primary Examiner*—John Rivell

(57) ABSTRACT

A valve assembly is disclosed which is adapted to fit existing valve bodies. A flexible diaphragm assembly positioned within the valve body seals against a cylindrical barrel of the valve body. A central tube positioned within the central barrel defines a bypass passage extending from an upper chamber above the flexible diaphragm assembly and communicating with a bypass orifice. A sealing mechanism operated by an automatic control mechanism is adapted to selectively seal the bypass orifice. The automatic control mechanism includes a proximity sensor.

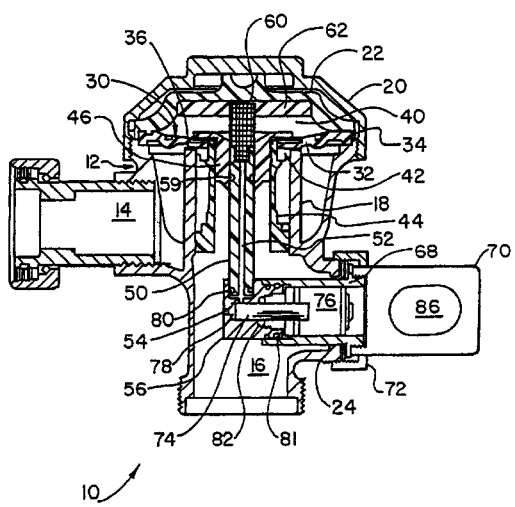

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3–20 is confirmed.

Claims 1 and 2 are determined to be patentable as amended.

New claims 21–25 are added and determined to be patentable.

1. A valve assembly comprising:
   a valve body including an inlet, an outlet, a cylindrical barrel positioned between said inlet and said outlet, and a manual handle extension opening *extending along a handle axis*;
   a flexible diaphragm assembly configured to selectively seal against an upper surface of said cylindrical barrel;
   a pilot valve mechanism for selectively moving said flexible diaphragm between a sealed and unsealed position; and
   an automatic control and sealing means configured to activate said pilot valve mechanism to selectively seal said flexible diaphragm against said upper surface, a portion of said automatic control *and sealing* means extending through said manual handle extension opening, and said automatic control *and sealing* means including a proximity sensor *directed in a transverse direction to the handle axis* mounted within a housing removably attached to said manual handle extension opening *by a threaded nut, whereby said sensor orientation may be adjusted about the handle axis by loosening the threaded nut, said valve assembly having a self-contained power source comprising at least one battery, said at least one battery contained within said housing, said battery accessed by a removable member positioned on an opposite side of said housing that is attached to said manual handle extension*.

2. The valve assembly of claim 1 wherein said [trip mechanism] *pilot valve mechanism* includes:
   a bypass assembly defining a bypass passage which extends from said flexible diaphragm assembly to said outlet; and
   a sealing means configured to selectively close said bypass passage.

21. *A valve assembly as claimed in claim 1, wherein said threaded nut comprises a lip captured between said housing.*

22. *A valve assembly as claimed in claim 21 wherein said nut only threadably engages with said handle extension handle opening.*

23. *A valve assembly comprising:*
   *a valve body including an inlet, an outlet, a cylindrical barrel positioned between said inlet and said outlet, and a manual handle extension opening extending along a handle axis;*
   *a flexible diaphragm assembly configured to selectively seal against an upper surface of said cylindrical barrel;*
   *a pilot valve mechanism for selectively moving said flexible diaphragm between a sealed and unsealed position; and*
   *an automatic control and sealing means configured to activate said pilot valve mechanism to selectively seal said flexible diaphragm against said upper surface, a portion of said automatic control and sealing means extending through said manual handle extension opening, and said automatic control and sealing means including a proximity sensor directed in a transverse direction to the handle axis mounted within a housing removably attached to said manual handle extension opening, whereby said sensor orientation may be adjusted about the handle axis, said valve assembly having a self-contained power source containing at least one battery, said at least one battery, accessed by a removable member positioned on the opposite side of said housing that is attached to said manual handle extension.*

24. *The valve assembly as claimed in claim 1, further comprising a threaded fastener for securing the removable member to said housing, said threaded fastener having a head positioned on the opposite side of said housing that is attached to said manual handle extension.*

25. *The valve assembly as claimed in claim 24, further comprising a threaded fastener for securing the removable member to said housing, said threaded fastener having a head positioned on the opposite side of said housing that is attached to said manual handle extension.*

* * * * *